(12) United States Patent
Fritsch et al.

(10) Patent No.: US 10,840,767 B2
(45) Date of Patent: Nov. 17, 2020

(54) ELECTRICALLY DRIVEN DEVICE

(71) Applicant: Braun GmbH, Kronberg (DE)

(72) Inventors: Thomas Fritsch, Eppstein (DE);
Andreas Kramp, Bad Camberg (DE);
Norbert Schaefer, Frankfurt am Main (DE)

(73) Assignee: Braun GmbH, Kronberg (DE)

( * ) Notice: Subject to any disclaimer, the term of this patent is extended or adjusted under 35 U.S.C. 154(b) by 350 days.

(21) Appl. No.: 15/715,115

(22) Filed: Sep. 25, 2017

(65) Prior Publication Data
US 2018/0091018 A1 Mar. 29, 2018

(30) Foreign Application Priority Data
Sep. 28, 2016 (EP) .................................. 16191026

(51) Int. Cl.
*F16H 21/40* (2006.01)
*A61C 17/34* (2006.01)
*H02K 7/075* (2006.01)
*A45D 26/00* (2006.01)

(52) U.S. Cl.
CPC ............. *H02K 7/075* (2013.01); *A45D 26/00* (2013.01); *A61C 17/3409* (2013.01); *A61C 17/3436* (2013.01); *A61C 17/3472* (2013.01); *F16H 21/40* (2013.01); *A45D 2026/008* (2013.01);
(Continued)

(58) Field of Classification Search
CPC .. F16H 21/40; A61C 17/3436; A61C 17/3418
See application file for complete search history.

(56) References Cited

U.S. PATENT DOCUMENTS

| | | |
|---|---|---|
| 3,233,265 A | 2/1966 | Willy |
| 3,474,795 A | 10/1969 | Hantman |
| 3,562,566 A | 2/1971 | Kircher |

(Continued)

FOREIGN PATENT DOCUMENTS

| | | |
|---|---|---|
| DE | 3544256 A1 | 6/1987 |
| JP | H09177923 | 7/1997 |

(Continued)

OTHER PUBLICATIONS

PCT/IB2017/055341 International Search Report with written opinion; dated Nov. 29, 2017, 12 pages.

*Primary Examiner* — Luis A Gonzalez
(74) *Attorney, Agent, or Firm* — Vladimir Vitenberg

(57) ABSTRACT

An electrically driven device includes an electric motor with a drive shaft having a first rotary axis and a drive pin eccentrically thereto, and a driven shaft having a second rotary axis and mounted for pivoting motion. The driven shaft is coupled to the drive shaft by a scotch yoke mechanism, converting a rotary motion of the drive shaft into a reciprocating pivoting motion of the driven shaft. The scotch yoke mechanism includes a cross slider having a sliding support extending perpendicular to the first rotary axis and receiving the drive pin either directly or by a sliding block having a bearing receiving the pin. The cross slider is axially guided to move in an axial direction perpendicular to the first rotary axis and to the extension of the sliding support. The driven shaft is coupled to the cross slider by a pivotable crank arm, thereby converting a rotary motion of the drive shaft into a reciprocating motion of the driven shaft.

14 Claims, 5 Drawing Sheets

(52) U.S. Cl.
CPC ...... *A61C 17/3418* (2013.01); *A61C 17/3454* (2013.01)

(56) References Cited

U.S. PATENT DOCUMENTS

| | | | |
|---|---|---|---|
| 3,699,952 A | 10/1972 | Waters | |
| 4,506,400 A | 3/1985 | Klein | |
| 4,628,605 A | 12/1986 | Clowers | |
| 5,283,921 A | 2/1994 | Ng | |
| 5,311,633 A | 5/1994 | Herzog | |
| 5,381,576 A | 1/1995 | Hwang | |
| 5,689,850 A * | 11/1997 | Shekalim | A46B 13/02 15/145 |
| 5,769,102 A | 6/1998 | Zebuhr | |
| 5,822,821 A | 10/1998 | Sham | |
| 5,974,615 A | 11/1999 | Schwarz-hartmann | |
| 6,237,178 B1 | 5/2001 | Krammer | |
| 6,363,565 B1 | 4/2002 | Paffrath | |
| 7,120,960 B2 | 10/2006 | Hilscher | |
| 7,614,107 B2 | 11/2009 | Cobabe | |
| 7,636,976 B2 | 12/2009 | Banning | |
| 7,810,200 B2 | 10/2010 | Fujimoto | |
| 7,861,348 B2 | 1/2011 | Chan | |
| 8,256,055 B2 | 9/2012 | Kressner | |
| 8,443,476 B2 | 5/2013 | Hilscher | |
| 8,701,235 B2 | 4/2014 | Kressner | |
| 8,875,335 B2 | 11/2014 | Kloster | |
| 8,943,634 B2 | 2/2015 | Sokol | |
| 9,089,390 B2 | 7/2015 | Klemm | |
| 2003/0131427 A1 | 7/2003 | Hilscher | |
| 2006/0027266 A1 | 2/2006 | Kim | |
| 2006/0101598 A1 | 5/2006 | Fujimoto | |
| 2010/0089414 A1 | 4/2010 | Wyatt | |
| 2012/0284937 A1 | 11/2012 | Kloster | |
| 2015/0173874 A1 | 6/2015 | Johnson | |
| 2018/0087631 A1 | 3/2018 | Kramp | |
| 2018/0087632 A1 | 3/2018 | Fritsch | |
| 2018/0087633 A1 | 3/2018 | Fritsch | |
| 2018/0091019 A1 | 3/2018 | Fritsch | |

FOREIGN PATENT DOCUMENTS

| | | |
|---|---|---|
| JP | 2001198145 | 7/2001 |
| JP | 2013226202 | 11/2013 |
| KR | 20080069373 | 7/2008 |
| WO | WO2011077285 | 6/2011 |

* cited by examiner

ELECTRICALLY DRIVEN DEVICE

FIELD OF THE INVENTION

The present invention is concerned with an electrically driven device, for example an electric toothbrush, an electric hair removal device or an electric skin treatment device.

BACKGROUND OF THE INVENTION

An electric toothbrush with a drive mechanism comprising gearwheels is known for example from DE 39 37 854 A1. The drive mechanism converts a continuous rotary movement of the drive shaft of an electric motor into a reciprocating pivoting of a driven shaft. EP 0 850 027 B1 and EP 1 357 854 B1 disclose further drive mechanisms with gearwheels wherein the mechanisms further generate an additional pivoting of the drive shaft about a swiveling axis. The use of gearwheels may contribute to increased sound emissions.

US 2006/0101598 A1 discloses an electric toothbrush with a scotch yoke mechanism converting a continuous rotary movement of the drive shaft of an electric motor into a reciprocating longitudinal displacement of a driven shaft.

Further, U.S. Pat. No. 5,381,576 describes an electric toothbrush comprising a housing, an electric motor with a drive shaft having a first rotary axis and a drive pin connected to the drive shaft eccentrically with respect to the rotary axis, and a driven shaft having a second rotary axis and mounted in the housing for performing a pivoting about the second rotary axis. The driven shaft is indirectly coupled to the drive pin by a gear mechanism converting a rotary motion of the drive shaft into a reciprocating pivoting of the driven shaft. The gear mechanism comprises an elastically deformable transmission member.

It is an object of the present disclosure to provide an electrically driven device with reduced sound emissions.

SUMMARY OF THE INVENTION

In accordance with one aspect there is provided an electrically driven device comprising a housing, an electric motor mounted in the housing and comprising a drive shaft having a first rotary axis, a driven shaft having a second axis and mounted in the housing for performing a movement relative to the housing. The driven shaft may be indirectly coupled to the drive shaft by means of a gear mechanism comprising a scotch yoke mechanism, i.e. a slotted link mechanism, converting a rotary motion of the drive shaft into a reciprocating reciprocating pivoting motion of the driven shaft. A drive pin may be connected to the drive shaft eccentrically with respect to the rotary axis. The scotch yoke mechanism comprises a cross slider having a sliding support which extends perpendicular to the first rotary axis and which receives the drive pin either directly or by means of a sliding block having a bearing receiving the drive pin. The cross slider is axially guided in the housing to be movable in an axial direction perpendicular to the first rotary axis and perpendicular to the extension of the sliding support. The driven shaft is coupled to the cross slider by means of a pivotable crank arm. The eccentric drive pin may be directly connected to the drive shaft or may be indirectly connected to the drive shaft, e.g. by means of one or more interposed elements and/or a gear.

In accordance with a further aspect, an electrically driven device with a housing and a drive shaft having a first rotary axis comprises a driven shaft pivotably mounted in the housing by means of a rocker frame. The rocker frame may be pivotable with respect to the housing about a pivoting axis which is perpendicular to the first rotary axis. An elastically deformable element may be provided between the housing and the rocker frame biasing the rocker frame into a rest position.

DETAILED DESCRIPTION OF THE INVENTION

Figure 1:
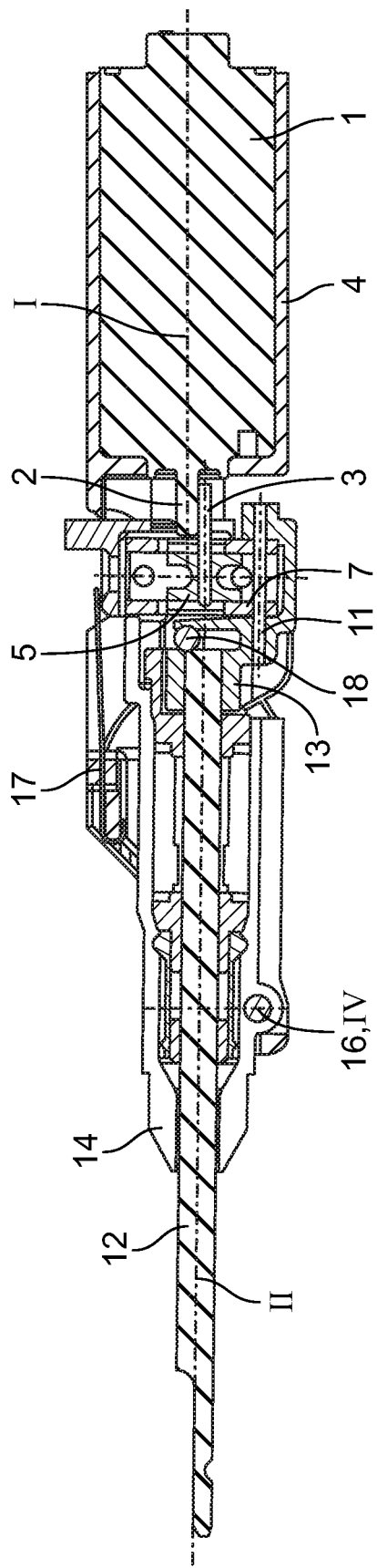
FIG. 1 shows a sectional view of a device according to a first embodiment.

Current toothbrush drive systems performing an oscillating pivoting of the cleaning element, e.g. a bristle, are perceived as being too loud. In particular, it is desirable to provide an electrically driven device with sound emissions below 55 dB(A) sound power level, especially at current drive frequency of 83 Hz. An important factor for noise is the form of the motion over time. The velocity is the first derivative of the displacement, the acceleration the second derivative of the motion. Higher accelerations and therefore inertia forces occur if the wave form is not a sine wave or harmonic. These periodic forces translate into bearing reaction forces and thus create an excitation to the structure of the device and this can cause undesired noise of elements oscillating in their natural frequency. Another source of noise is two bodies hitting each other and creating a rattling noise. This occurs for example in cam driven systems.

According to an aspect, the gear mechanism comprises a first transmission stage and a second transmission stage. For example, in a first step a side to side motion is generated by the first transmission stage, whereas an oscillating motion of the driven shaft is generated in a second step by the second transmission stage. The side to side motion may be generated by the first transmission stage by means of a sliding block having a bearing receiving the drive pin and a cross slider having a sliding support which extends perpendicular to the first rotary axis and which receives the sliding block. For example, the cross slider may be displaceably mounted in the housing by means of at least two stationary bars extending perpendicular to the first rotary axis and perpendicular to the extension of the sliding support. In other words, the cross slider is axially guided in the housing to be movable in an axial direction performing a reciprocating axial side to side motion perpendicular to the first rotary axis and perpendicular to the extension of the sliding support. The extension of the sliding support is understood to be the axial direction of the reciprocating movement of the sliding block in the cross slider during use of the device.

The pivotable crank arm of the second transmission stage may be pivotably hinged to a bearing point of the cross slider and rotationally constrained to an anchorage point of the driven shaft.

The oscillating motion created in the cross slider is transmitted to the driven shaft by means of the arm and translated into a pivoting motion of the driven shaft. In accordance with one aspect, the gear mechanism is provided converting a rotary motion of the drive shaft into a reciprocating pivoting of the driven shaft, preferably a sinusoidal movement of the driven shaft or a substantially sinusoidal movement of the driven shaft. This contributes in reducing the noise generated in use of the device.

The crank arm may comprise a bracket with two legs, for example with a C-form in a sectional view, partly receiving the cross slider. The crank arm may be pivotably hinged to the cross slider by means of a pin extending through the cross slider and at least partly through the legs. The crank arm may comprise a spring flap or the like elastically deformable member engaging the housing or a component part fixed to the housing, e.g. a bar constrained to the housing. For example, a bar is provided constrained to the housing and located at the end of the driven shaft facing towards the motor. These features may contribute in reducing axial play in the driven shaft. In addition, the bar may prevent damages to the gear mechanism in case that the device is dropped falling onto the driven shaft.

The electrically driven device may further comprise a sliding block having a bearing receiving the drive pin. For example, the sliding block may be axially guided in the sliding support of the cross slider. In other words, the gear mechanism may work similar to the scotch yoke mechanism translating a continuous rotation of the drive pin into a reciprocating pivoting movement of the cross slider and of the driven shaft. As an alternative to the provision of a sliding block within the cross slider, the drive pin may directly engage the sliding support of the cross slider, e.g. having the form of a slotted hole.

The housing may be a single, unitary component part suitable for encasing and/or mounting further component parts of the device. In other embodiments, the housing may comprise different component parts, for example an outer shell, an insert, a chassis and/or a frame. For example, the housing comprises an outer shell and a chassis mounted within the outer shell, wherein the least two stationary bars are fixed within the chassis.

In other embodiments it may be desirable that the driven shaft performs a 3D motion, e.g. an oscillating pivoting about the second rotary axis with a superimposed pivoting of the driven shaft about a further axis. This may be caused by the crank arm performing a rotary motion about the driven shaft while being constrained to the cross slider which moves only axially. Due to these different movements, an axial force $F_X$ is exerted on the driven shaft which may result in an additional motion of the driven shaft. In this respect, the driven shaft may be pivotably mounted in the housing, e.g. by means of a rocker frame which is pivotable with respect to the housing about a pivoting axis which is perpendicular to the first rotary axis and perpendicular to the extension of the sliding support. The driven shaft may be guided in the rocker frame by means of at least one bearing insert or may be guided directly in the rocker frame.

For example, an elastically deformable element, e.g. a spring, may be provided between the housing and the rocker frame biasing the rocker frame into a rest position or a zero position with a biasing force $F_Y$. The spring may be a leaf spring or, e.g. a cylindrical spring. The rest position may be defined by the elastically deformable element being in an unstressed condition, i.e. the biasing force $F_Y$ is zero. In addition or as an alternative, the rocker frame may be abutting a first stop in the rest position or zero position.

A switch or sensor may be provided and arranged in the housing such that the switch or sensor detects movement of the rocker frame with respect to the housing. In more detail, the switch or sensor may be arranged in the housing such that the switch or sensor detects movement of the rocker frame with respect to the housing exceeding a threshold movement. For example, a deviation from the rest position or zero position may be detected. If a force is applied on the driven shaft, for example via a brush head of a toothbrush, the rocker frame is pivoting about the axis and is displaced against the housing and/or a PCB mounted in the housing. This movement may be used to measure and control the applied pressure. The execution may be a threshold, where a switch is activated or a magnet and a hall sensor may be used to measure the displacement. Other options include optical means or inductive proximity sensors. The travel of the arm for the pressure sensor may be in the range of <0.5 mm to 2 mm, e.g. at a force of 0.5 to 4N.

The lateral side to side movement of the cross slider may generate an intermittent force $F_X$ in a direction perpendicular to the second axis which intermittent force $F_X$ is transmitted to the rocker frame via the pivotable crank arm and the driven shaft. The intermittent force $F_X$ may bias the rocker frame away from the rest position. To permit a 3D movement of the driven shaft, the intermittent force $F_X$ generated by the motion of the cross slider may exceed the biasing force $F_Y$ of the elastically deformable element.

According to one aspect, the rocker frame pivots relative to the housing with a constant amplitude and a varying force depending on the magnitude of a user force exerted on the driven shaft, for example a contact pressure of a toothbrush to the user's teeth. For example, if the rocker frame is in its rest position with respect to the housing with the elastically deformable element being unstressed, a user force exerted on the driven shaft may be directed opposite to the intermittent force $F_X$ generated by the motion of the cross slider and/or opposite to the biasing force $F_Y$.

The electrically driven device may comprise a standard DC motor. The motor may have a torque of at least 2 mNm, for example 2.5 mNm, at a speed of 4,800 to 7,200 rpm at a voltage of 3 to 4V. This voltage may be supplied by a Li-Ion battery or any other battery combination providing voltages above 3V and low internal resistance. In addition or as an alternative, the motor may be connected to the mains supply.

Figure 2A:
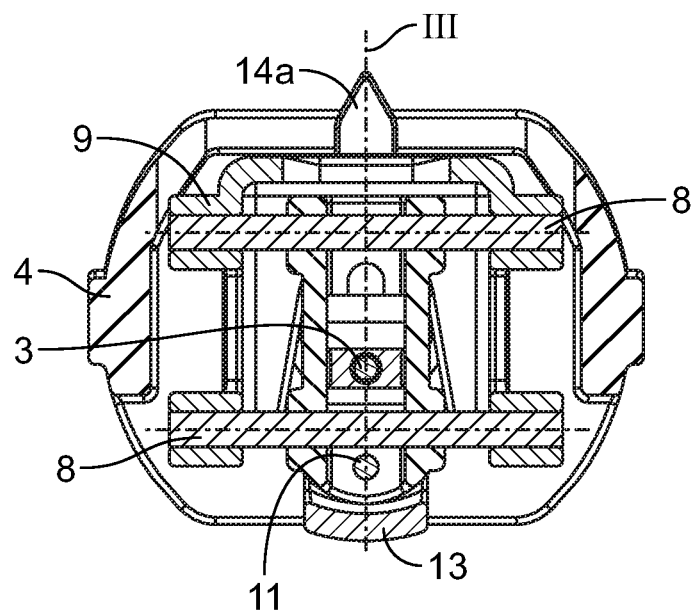
FIGS. 2a-b show different sectional views of the device of FIG. 1 perpendicular to the view of FIG. 1.
Figure 2B:
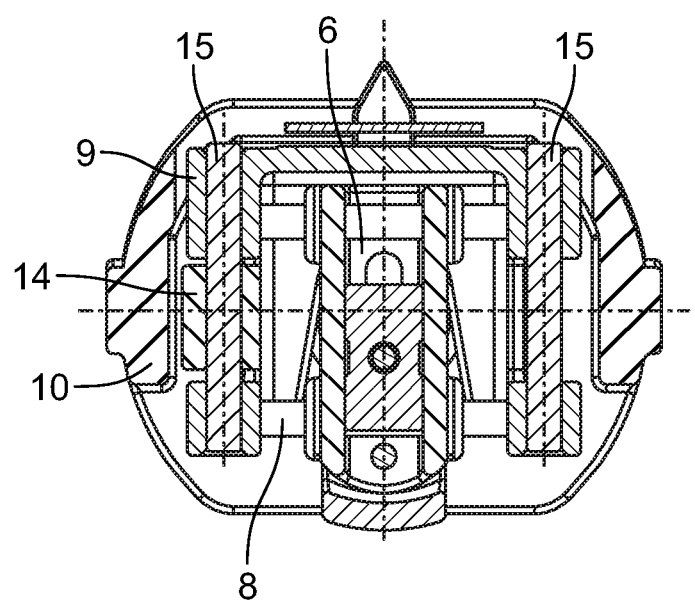

In the embodiment depicted in FIGS. 1 to 3 a portion of an electrically driven device in the form of an electric toothbrush is shown. The device comprises an electric motor 1 with a drive shaft 2 rotating during use. A pin 3 is eccentrically attached to the drive shaft 2. The motor 1 is constrained in a device housing 4 or a chassis mounted in the housing which is only partly visible in FIG. 1. The drive shaft 2 defines a first rotary axis I. The pin 3 is coupled to a sliding block 5 such that the sliding block 5 follows movement of the pin 3. However, the pin 3 may be rotated within an aperture of the sliding block 5. The pin 3 in turn is guided in a sliding support 6 of a cross slider 7. The cross slider 7 is mounted in the housing 4 by means of two bars 8 which are received in a chassis 9. The chassis 9 is rigidly connected to an outer shell 10 (see FIG. 2*b*) which form the housing 4, e.g. with additional housing components. The cross slider 7 comprises an opening receiving a pin 11.

A driven shaft 12 is coupled to the cross slider 7 by means of the pin 11 and a crank arm 13. As can be seen in FIG. 1, the crank arm 13 is rigidly fixed to the driven shaft 12 and has the form of a bracket receiving a portion of the cross slider 7 between the legs of the bracket. The pin 11 extends through the cross slider 7 and engages both legs of the bracket of crank arm 13. In other words, they crank arm 13 follows movement of the cross slider 7 but is rotatable with respect to cross slider 7.

The driven shaft 12 defines a second rotary axis II. The driven shaft 12 is rotatably guided in bearings of a rocker frame 14. The arm 13 is rotationally constrained to an anchorage point of the driven shaft 12. The arm 13 may be made of plastic and a knurl or an undercut in the driven shaft so that a form fit is created. Another option is to press fit an additional part on the driven shaft 12.

The rocker frame 14 is pivotably mounted in the housing 4 by means of a bar 15. Further, the rocker frame 14 is coupled to a chassis 9 by means of further bars 16 which guide the rocker frame 14 with a play. Pivoting of the rocker frame 14 about bar 15 with respect to the housing 4 is reacted by a leaf spring 17 which is arranged interposed between of the housing 4 and the rocker frame 14. Spring 17 may have a lateral support to the chassis of housing 4, for example spring loaded. This support avoids side to side movement of the rocker frame 14. As an alternative, a different type of an elastically deformable element 17 may be used, for example a cylindrical coil spring. The rocker frame is provided with an indicator 14a which may be provided with a magnet. The position of the magnet, i.e. the displacement of the rocker frame, may be detected by means of a hall sensor (not shown). As an alternative, the indicator may activate a switch, an optical detector or an inductive proximity sensor.

A further bar 18 is constrained in the housing 4 at a position abutting or in close contact with the driven shaft 12 at the end of the driven shaft 12 facing towards the motor 1. This bar 18 is assembled directly under the driven shaft 12 to take up the forces created in a drop of the device on the driven shaft. To avoid axial movements a spring element may be molded into the connector arm 13 of the driven shaft. In other words, the crank arm 13 may have a C-form configuration in the sectional view of FIG. 1 engaging bar 18, with the lower section of the C-form being flexible. Another spring element is also possible.

As can be seen in FIG. 1, which shows the device in a rest position or a zero position, the first rotary axis I extends in parallel to the second rotary axis II. A third axis III is defined by the sliding support 6 within the cross slider 7. The third axis III is perpendicular to the first rotary axis I and perpendicular to the plane of the sectional view if FIG. 1. A fourth axis IV is defined by bar 16. The fourth axis IV is perpendicular to the first rotary axis I and perpendicular to the third axis III.

Figure 3A:
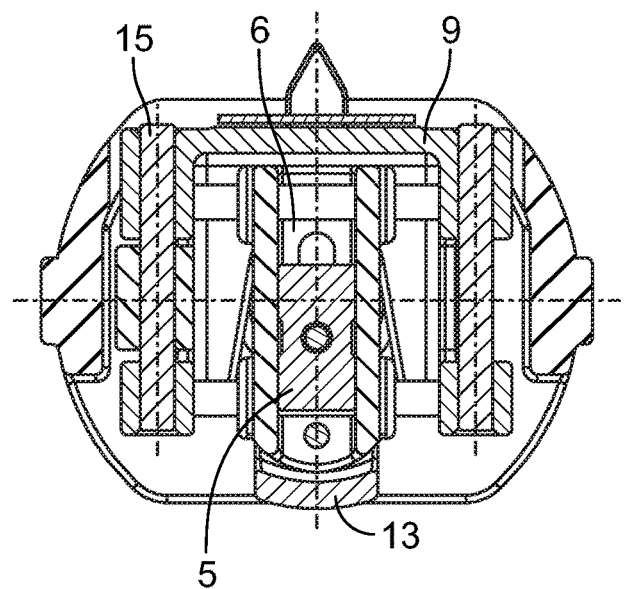
FIGS. 3a-d show further sectional views of the device of FIG. 1 perpendicular to the view of FIG. 1 in different positions of the drive pin.
Figure 3B:
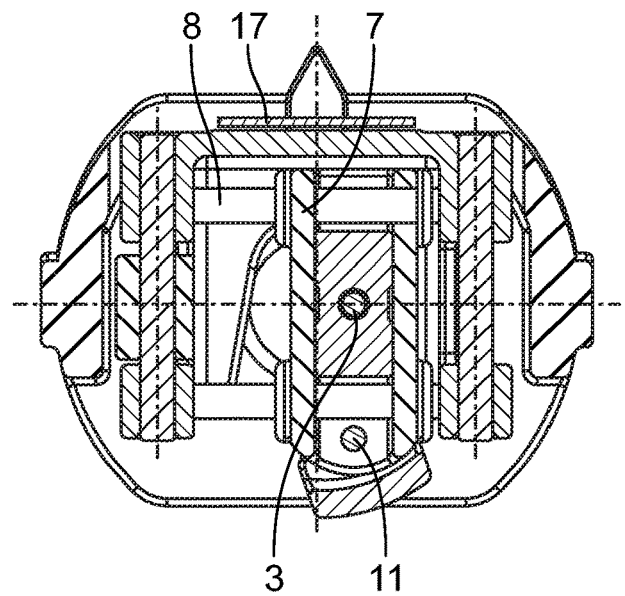
Figure 3C:
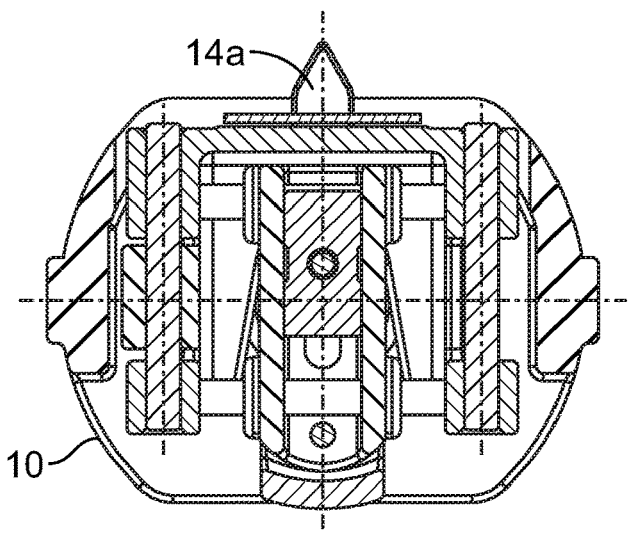
Figure 3D:
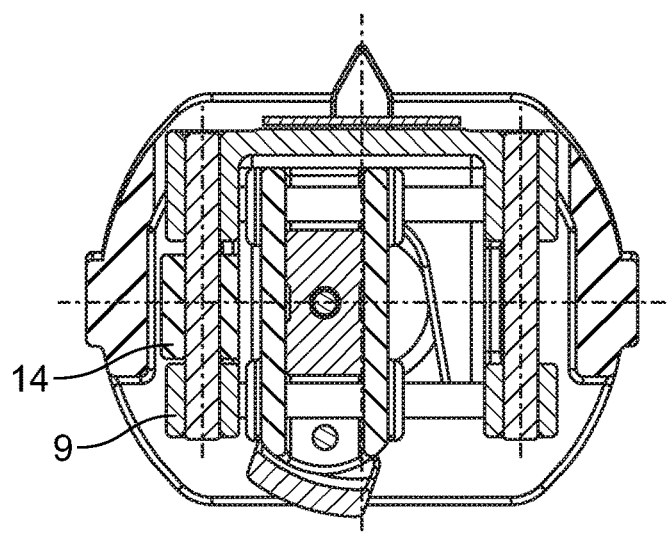

In the following, operation of the device is explained in more detail with reference to the figures. FIGS. 3a to 3d depict different positions of the sliding block 5 and the cross slider 7 during operation of the motor 1. The eccentric pin 3 welded to the motor shaft 2 is rotating. The pin 3 is mounted in a hole in the sliding block 5. The sliding block 5 is sliding in one direction in cross slider 7 and, thus, from the rotational motion a side to side motion in sine wave form is created. This is the working principle of a scotch yoke mechanism or slotted link mechanism. The output is a linear motion due to bars 8 guiding the cross slider 7 axially. FIG. 3a depicts of the device in a starting position with the cross slider 7 in a center position and the sliding block 5 in a lower position. The center of crank arm 13 is aligned with the third axis III. FIG. 3b shows the device with the drive shaft 2 and the eccentric pin 3 being rotated by 90°. Due to this rotation sliding block 5 is in a central position and cross slider 7 is laterally displaced to the right in FIG. 3b. Consequently, crank arm 13 is deviated and rotates about the second axis II. FIG. 3c shows the device with the drive shaft 2 rotated by 180° compared with the position of FIG. 3a. The cross slider 7 is again in a central position and the sliding block 5 is in an upper position. Crank arm 13 is rotated back to the central position. FIG. 3d shows the device with a drive shaft 2 rotated by 270° such that the cross slider 7 is laterally displaced to be left in FIG. 3d while the sliding block 5 is in the central position. Crank arm 13 is deviated and rotated about the second axis II in the opposite direction compared with FIG. 3b.

Due to the crank arm 13 rotating about the second axis II while cross slider 7 performs a pure axial displacement, a force $F_X$ acting on the driven shaft 12 and the rocker frame 14 is generated. This force $F_X$ causes swiveling of the rocker frame 14 about bar 16 against the biasing force $F_Y$ of the spring 17. For example, the biasing force $F_Y$ of the spring is smaller than the force $F_X$ generated during rotation of motor 1. In other words, the rocker frame 14 is driven pivoting about bar 16 against biasing force $F_Y$ of leaf spring 17 if no external force is exerted on the driven shaft 12 resulting in a 3D motion of the driven shaft 12. The movement of the rocker frame 14 is shown in FIGS. 3a to 3d by the lateral space of the portion of the rocker frame 14 guided on bars 15 with respect to the chassis 9. For example, the lower space between the rocker frame 14 and the chassis 9 is slightly larger than the upper space between the rocker frame 14 and the chassis 9 in FIGS. 3a and 3c. In contrast to that, the upper space between the rocker frame 14 and the chassis 9 is slightly larger than the lower space between the rocker frame 14 and the chassis 9 in FIGS. 3b and 3d. In other words, the oscillation of driven shaft 12 and the rocker frame 14 in response to the force $F_X$ has twice the frequency of the driving frequency of the motor 1.

In the embodiment depicted in the Figures, the device may be a toothbrush with a brush head (not shown) which may be, e.g. releasably, attached to the driven shaft 12. If a force is applied on the brush head the rocker frame 14 is pivoting about the axis IV defined by bar 16 and is displaced against the chassis of housing 4 and a PCB (not shown) mounted on the chassis of housing 4. This movement can be used to measure and control the applied pressure.

Figure 4A:
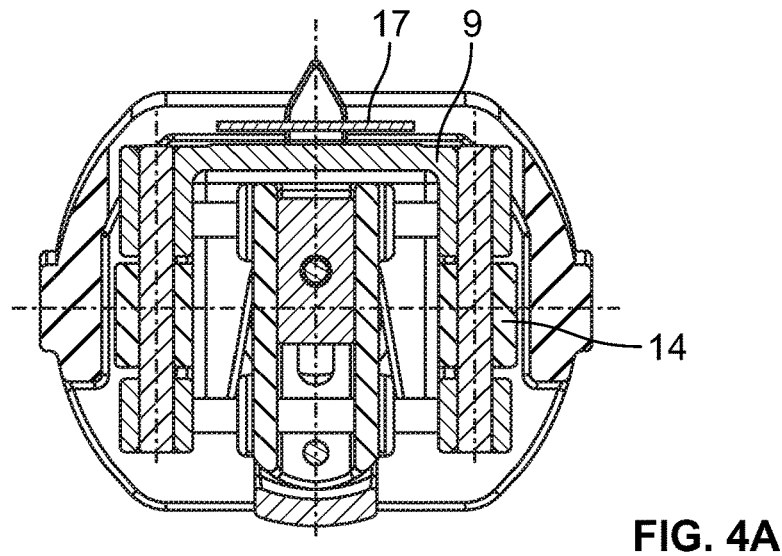
FIGS. 4a-b show sectional views of the device in the position of FIG. 3c with different loads applied to the driven shaft.
Figure 4B:
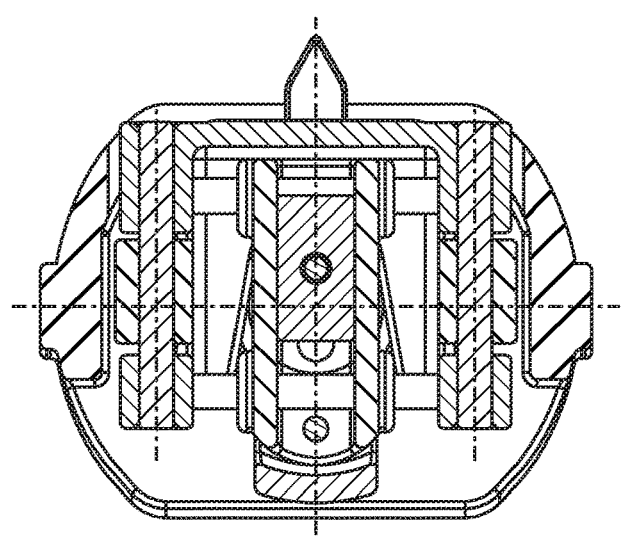

FIGS. 4a and 4b show the device in the same position as FIG. 3c but with different user forces applied to the driven shaft 12. For example, in FIG. 4a a small user force, e.g. 0.5 N, is applied, whereas in FIG. 3c a larger force, e.g. 2.25 N, is applied and a still larger force, e.g. 4.0 N, is applied in FIG. 4b. Comparing FIGS. 3c, 4a and 4b a different space between spring 17 and chassis 9 may be identified indicating different displacements due to the different user forces.

The eccentric pin 3 is rotating on a circle. The displacement to the side is the radius to the center of the motor axis I. For example with a radius of 1.5 mm, the side to side travel d is d=±1.5 mm. As the pin 3 is in a hole in the sliding block 5, the sliding block 5 and the cross slider move the same distance. With a distance r between the second axis II and the pin 11 of e.g. r=4.5 mm, the oscillation angle phi being 19.5° may be calculated from the equation:

$$\sin(phi)=d/r \tag{1}$$

The transvers motion t (in x direction) of the driven shaft 12 may be calculated from the equation:

$$t=r-r*\cos(phi) \tag{2}$$

Figure 5:
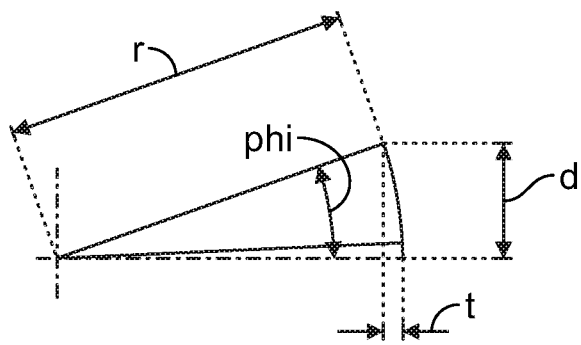
FIG. 5 schematically shows the correlation of values of the mechanism.

With the above exemplary values, this results to t=0.257 mm FIG. 5 schematically shows the correlation for the values r, d, t and phi. This motion is directed to the driven shaft 12 at the lower end and at a shorter distance to the pivoting axis IV (at bar 16) than the brush head (not shown). If, for example, the distance of the actuation to the pivoting axis is 35.5 mm and the distance from the pivoting axis to the brush head is 65 mm the resulting 3D motion will be 0.257 mm*65/35.5=0.47 mm. In reality the 3D motion may be a bit smaller than in the ideal mathematical model due to clearances in the joints and due to elasticity in the component parts. As an alternative, a 3D motion in the magnitude of for example 0.03 to 0.20 mm or up to 0.30 mm, in particular 0.04 mm to 0.1 mm, may be desirable for some toothbrushes. Other values may be desirable for different devices.

Figure 6:
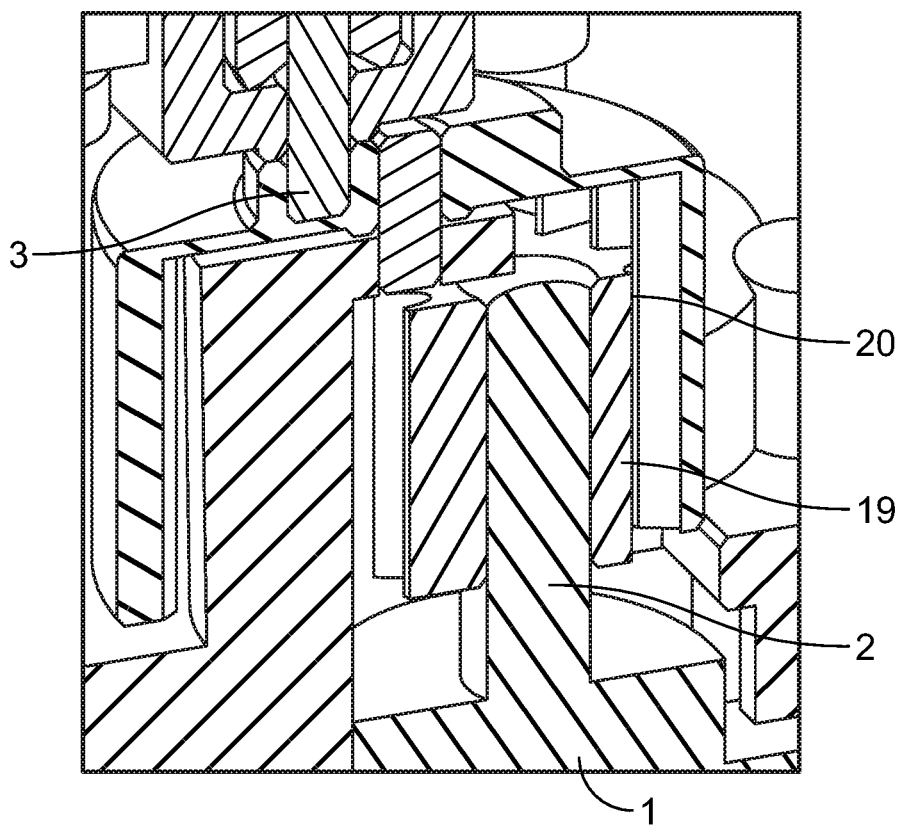
FIG. 6 shows a sectional view of a device according to a further embodiment.

FIG. 6 shows an alternative arrangement of the drive pin 3 with respect to the drive shaft 2 of the motor 1. In this embodiment a further gear mechanism is interposed between the drive shaft 2 and the drive pin 3. In more detail, a pinion 19 is provided on the drive shaft 2 meshing with a ring gear 20 which in turn carries the drive pin 3. The gear ratio between the drive shaft 2 and the drive pin 3 may be adapted as required, e.g. depending from the torque and/or voltage of the motor 1.

As an alternative to the depicted embodiment with the crank arm 13 and the driven shaft 12 being separate component parts, the crank arm may be a unitary component part with the driven shaft.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm."

Every document cited herein, including any cross referenced or related patent or application and any patent application or patent to which this application claims priority or benefit thereof, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

REFERENCE NUMERALS

1 motor
2 drive shaft
3 pin
4 housing
5 sliding block
6 sliding support
7 cross slider
8 bar
9 chassis
10 outer shell
11 pin
12 driven shaft
13 arm
14 rocker frame
14*a* indicator
15 bar
16 bar
17 spring
18 bar
19 pinion
20 ring gear
I first rotary axis
II second rotary axis
III third axis
IV fourth axis

What is claimed is:

1. An electrically driven device comprising
a housing (4),
an electric motor (1) mounted in the housing (4) and comprising a drive shaft (2) having a first rotary axis (I),
a driven shaft (12) having a second axis (II) and mounted in the housing (4) for performing a movement relative to the housing (4),
wherein the driven shaft (12) is indirectly coupled to the drive shaft (2) by a gear mechanism comprising a scotch yoke mechanism (5, 7) converting a rotary motion of the drive shaft (2) into a reciprocating motion of the driven shaft (12), wherein
a drive pin (3) is connected to the drive shaft (2) eccentrically with respect to the rotary axis (I), the scotch yoke mechanism comprises a cross slider (7) having a sliding support (6) which extends perpendicular to the first rotary axis (I) and which receives the drive pin (3) either directly or by a sliding block (5) having a bearing receiving the drive pin (3), wherein the cross slider (7) is axially guided in the housing (4) to be movable in an axial direction perpendicular to the first rotary axis (I) and perpendicular to the extension (III) of the sliding support (6), and
the driven shaft (12) is coupled to the cross slider (7) by a pivotable crank arm (13), thereby converting a rotary motion of the drive shaft (2) into a reciprocating pivoting of the driven shaft (12),
wherein the cross slider (7) is displaceably mounted in the housing (4) by at least two stationary bars (8) extending perpendicular to the first rotary axis (I) and perpendicular to the extension (III) of the sliding support (6).

2. The electrically driven device according to claim 1, wherein the housing (4) comprises an outer shell (10) and a chassis (9) mounted within the outer shell (10), wherein the at least two stationary bars (8) are fixed within the chassis (9).

3. The electrically driven device according to claim 1, wherein the pivotable crank arm (13) is pivotably hinged to a bearing point (15) of the cross slider (7) and rotationally constrained to an anchorage point of the driven shaft (12).

4. The electrically driven device according to claim 3, wherein the crank arm (13) comprises a bracket with two legs partly receiving the cross slider (7), wherein the crank arm (13) is pivotably hinged to the cross slider (7) by a pin (15) extending through the cross slider (7) and at least partly through the legs.

5. The electrically driven device according to claim 3, wherein the crank arm (13) comprises a spring flap engaging the housing (4) or a component part (18) fixed to the housing (4).

6. The electrically driven device according to claim 1, wherein a bar (18) is provided constrained to the housing (4) and located at the end of the driven shaft (12) facing towards the motor (1).

7. The electrically driven device according to claim 1, wherein the driven shaft (12) is pivotably mounted in the housing (4) by a rocker frame (14) which is pivotable with respect to the housing (4) about a pivoting axis (IV) which is perpendicular to the first rotary axis (I) and perpendicular to the extension (III) of the sliding support (6).

8. The electrically driven device according to claim 7, wherein an elastically deformable element (17) is provided between the housing (4) and the rocker frame (14) biasing the rocker frame (14) into a rest position with respect to the housing (4).

9. The electrically driven device according to claim 7, wherein a switch or sensor is arranged in the housing (4) such that the switch or sensor detects movement of the rocker frame (14) with respect to the housing (4).

10. The electrically driven device according to claim 7, wherein the rocker frame (14) is further guided with respect to the housing (4) by at least one additional bar (15) extending parallel to the pivoting axis (IV).

11. The electrically driven device according to claim 7, wherein movement of the cross slider (7) generates an intermittent force ($F_x$) in a direction perpendicular to the axial movement of the cross slider (7) which intermittent force ($F_x$) is transmitted to the rocker frame (14) via the crank arm (13) and the driven shaft (12), with the intermittent force ($F_x$) biasing the rocker frame (14) away from the rest position.

12. The electrically driven device according to claim 11, wherein the intermittent force ($F_x$) generated by the motion of the cross slider (7) exceeds the biasing force ($F_v$) of the elastically deformable element (17).

13. The electrically driven device according to claim 12, wherein if the rocker frame (14) is in its rest position with respect to the housing (4) with the elastically deformable element (17) being unstressed, a user force exerted on the driven shaft (12) is directed opposite to the intermittent force ($F_x$) generated by the motion of the cross slider (7).

14. The electrically driven device according to claim 1, wherein the gear mechanism converts a continuous rotary motion of the drive shaft (2) into a sinusoidal reciprocating displacement of the cross slider (7).

\* \* \* \* \*